April 13, 1965 C. H. COKER 3,178,617

CIRCUIT BREAKER WITH BISTABLE CIRCUIT FOR OVERCURRENT PROTECTION

Filed May 2, 1960 4 Sheets-Sheet 1

INVENTOR.
CECIL H. COKER
BY
Christie, Parker & Hale
ATTORNEYS.

INVENTOR.
CECIL H. COKER
BY Christie, Parker & Hale
ATTORNEYS.

INVENTOR.
CECIL H. COKER
BY
Christie, Parker & Hale
ATTORNEYS.

CIRCUIT BREAKER WITH BISTABLE CIRCUIT FOR OVERCURRENT PROTECTION

Filed May 2, 1960

4 Sheets-Sheet 4

INVENTOR.
CECIL H. COKER
BY
Christie, Parker & Hale
ATTORNEYS.

3,178,617

CIRCUIT BREAKER WITH BISTABLE CIRCUIT FOR OVERCURRENT PROTECTION

Cecil H. Coker, Madison, Wis., assignor to Wisconsin Alumni Research Foundation, Madison, Wis., a not for private profit corporation of Wisconsin Filed May 2, 1960, Ser. No. 26,026
11 Claims. (Cl. 317—33)

This invention relates to circuit breakers.

Mechanical circuit breakers of the type constructed to interrupt the flow of electrical current through a circuit are well known and widely used. Such breakers are large and cumbersome and they are relatively slow. They are therefore inadequate for many electronic circuits. Fuses are frequently used in electronic circuits but they are subject to the disadvantages of being slow in operation, somewhat difficult to replace and of not being adjustable without replacement.

This invention provides a completely electronic circuit breaker which is capable of high speed breaking and resetting operation which is desirable for electronic circuits. Also, the circuit breaking or "fuse" level can be adjusted with ease.

Briefly, this invention contemplates an electronic circuit breaker for a current passing through a load in which the circuit breaker includes a bistable electronic circuit capable of operating in either a first or second state. Means responsive to current flow through the load are provided for changing the bistable circuit from a first to a second state of operation. Electronic switching means are provided for controlling the current passing through the load, and means responsive to the state of operation of the bistable circuit are provided for actuating the electronic switching means.

In the preferred form of the invention, the bistable circuit and the switching means include transistor devices as the active elements.

These and other aspects of the invention will be more fully understood from the following detailed description taken in conjunction with the accompanying drawings, in which.

Figure 1:
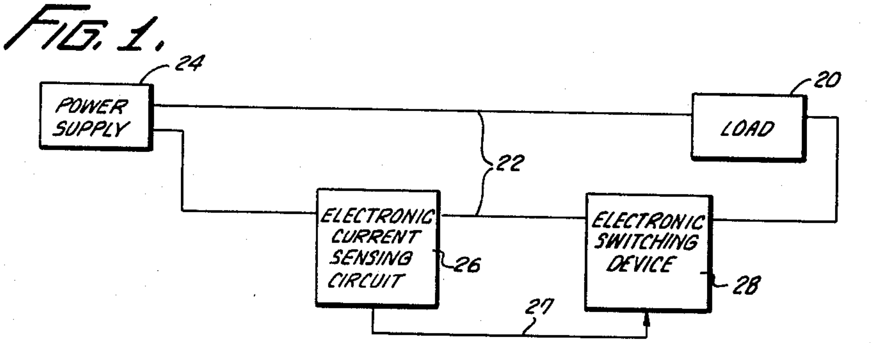
FIG. 1 is a schematic circuit diagram showing the general principle of this invention.

Referring to FIG. 1, a typical electronic circuit includes a load 20 connected by leads 22 to a power supply 24. In accordance with this invention, electronic bistable current-sensing circuit or multivibrator 26 is connected in the circuit to assume one of two operating states in accordance with the amount of current passing through the load. The bistable circuit is connected by conductor 27 to an electronic switching device 28 which is connected to open or close the load circuit in accordance with the operating state of the bistable element. In some application, the switching device may not actually create an open circuit, but will substantially reduce the current flow.

Figure 2:
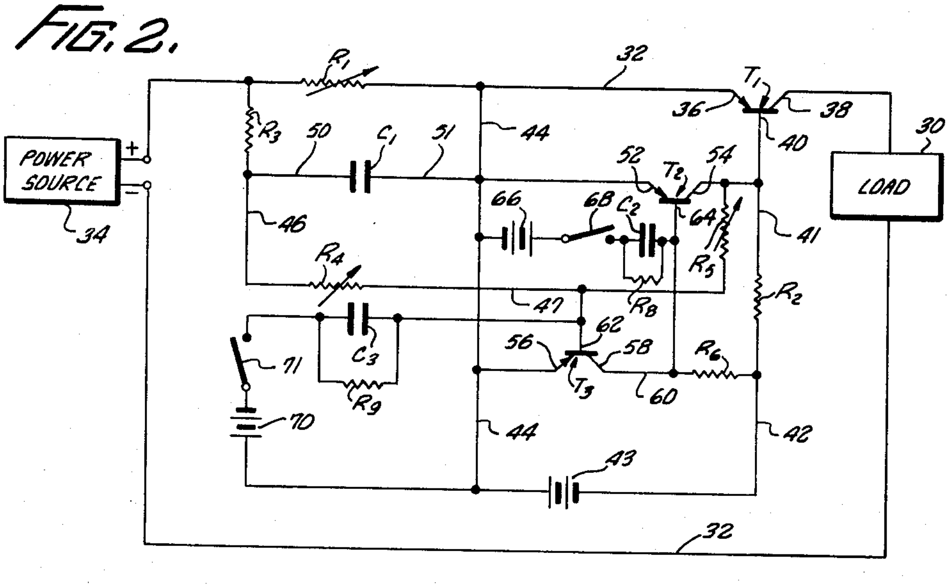
FIG. 2 is a circuit diagram of the presently preferred embodiment of this invention using a pair of transistors connected in a "flip-flop" arrangement to control the conductance of a third transistor serving as a switch.

FIG. 2 shows a specific form of the invention in which a load 30 is connected by leads 32 to the opposite terminals of a power source 34 which may be a steady or pulsating direct current supply. A sensing resistor $R_1$ (which may be variable as shown) is connected in series with the load and the positive terminal of the power supply, and first variable and controllable impedance device such as transistor $T_1$ (of PNP type, shown by the conventional symbols) is connected between resistor $R_1$ and the load, the first electrode or emitter 36 of the first transistor being connected to the more negative end of resistor $R_1$, and the second electrode or collector 38 of the first transistor being connected to the load. The control electrode or base 40 of the first transistor is connected by lead 41 to one end of a resistor $R_2$, which is connected at its other end by a conductor 42 to the negative terminal of a biasing battery 43, the positive terminal of which is connected by a lead 44 to the load circuit between resistor $R_1$ and emitter 36.

One end of a resistor $R_3$ is connected to the load circuit between the positive terminal of the power supply and the more positive end of resistor $R_1$. The other end of resistor $R_3$ is connected by a lead 46 to one end of a variable resistor $R_4$, the other end of which is connected by a lead 47 to a variable resistor $R_5$ which in turn is connected to lead 41 between resistor $R_2$ and base 40 of the first transistor $T_1$. A capacitor $C_1$ is connected on one side by a lead 50 to lead 46, and is connected on its other side by a lead 51 to lead 44 and the emitter 52 of a second transistor $T_2$, the collector 54 of which is connected to lead 41.

The emitter 56 of a third transistor $T_3$ is connected to lead 44, and the collector 58 is connected by a lead 60 to one end of a resistor $R^6$ which is connected at its other end to lead 42. The base 62 of the third transistor $T_3$ is connected to lead 47, and the base 64 of the second transistor $T_2$ is connected to lead 60.

Thus the output circuit of the transistor $T_1$ (emitter and collector electrodes) is connected in series with the load 30 and the input circuit of the transistor $T_1$ (emitter and base electrodes) is connected across the emitter and collector electrodes of the transistor $T_2$ (the output of the bistable circuit including the transistors $T_2$ and $T_3$). The base and emitter electrodes of the transistor $T_3$ (the input circuit of the bistable circuit) are coupled to the sensing resistor $R_1$ to render the transistor $T_3$ nonconducting and the transistor $T_2$ conducting when the load current exceeds a predetermined value as will be more fully explained.

The negative terminal of a first resetting battery 66 is connected to lead 44, and the positive terminal of the first resetting battery is connected through a switch 68 and a parallel network of a capacitor $C_2$ and a resistor $R_8$ to the base 64 of the second transistor $T_2$ so that a positive pulse can be applied to the base of the second transistor with respect to its emitter to reset the circuit breaker of FIG. 2. Alternatively, the negative terminal of a second resetting battery 70 is connected through a switch 71 and a parallel network of a capacitor $C_3$ and a resistor $R_9$ to the base 62 of the third transistor. The positive terminal of the second resetting battery is connected to the emitter 56 of the third transistor through lead 44 so the base of the third transistor can be made negative with respect to its emitter to reset the circuit breaker.

The operation of the circuit shown in FIG. 2 is as follows: The circuit components are selected so that as long as less than a predetermined maximum amount of current is flowing through the load, transistors $T_1$ and $T_3$ are conducting, and transistor $T_2$ is nonconducting. If the flow of current through the load circuit tries to exceed the predetermined value, the voltage at the juncture of conductors 46 and 50 becomes sufficiently positive to cause the third transistor $T_3$ to stop conducting and the second transistor $T_2$ to start conducting. This, in turn, makes the base 40 of the first transistor sufficiently positive with respect to its emitter to cut off or stop virtually all the flow of current through the load 30. This condition remains until the circuit breaker is reset by reversing the conductive states of the second and third transistors. One method for doing this is to apply a pulse of positive current to the base 64 of the second transistor with respect to its emitter by manual operation of the switch 68. An alternative method is to apply a negative pulse by manual operation of switch 71 to the base 62 of the third transistor with respect to the emitter. In either case, the respective capacitor $C_2$ or $C_3$ permits the circuit breaker to "blow out" again even before the reset switch need be released, if an overload condition still exists. If this is of no concern, the capacitors $C_2$ and $C_3$ can be omitted.

The blowing or "fusing" of the circuit breaker shown in FIG. 2 depends on the average value of current through the load, where the averaging time constant is approximately:

$$T=C_1\times\frac{R_3\times R_4}{R_3+R_4}$$

The circuit can be made to fuse on the instantaneous value or current by eliminating the capacitor $C_1$, thus making the time constant approach zero.

The fuse level of the breaker of FIG. 2 can be changed by varying the values of the resistors $R_1$, $R_4$ or $R_5$ or by applying a positive voltage of an appropriate value between the leads 51 and 44.

Figure 3:
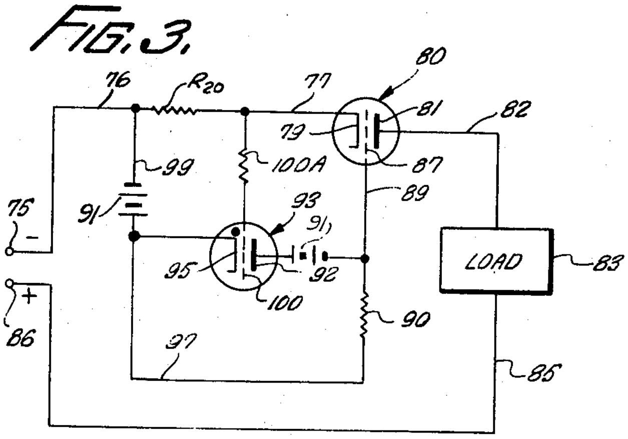
FIG. 3 is a schematic diagram of circuit using a thyratron in a bistable circuit to control a vacuum tube which serves as an electronic switch.

In the circuit of FIG. 3, electrons are supplied from a negative terminal 75 through a lead 76, a resistor $R_{20}$, a lead 77, a cathode 79 of a switching tube 80, a plate 81, a lead 82, a load 83, and a lead 85 back to a positive terminal 86 of the power supply. A control grid 87 of the switching tube is connected through a lead 89 to one end of a resistor 90, the other end of which is connected to the positive terminal of a first battery 96. A plate 92 of a thyratron 93 (of a bistable circuit) is connected to the positive terminal of a second battery 91, the negative terminal of which is connected to lead 89. A cathode 95 of the thyratron is connected to the positive terminal of battery 96, the negative terminal of which is connected by a lead 99 to lead 76. A control grid 100 of the thyratron is connected through a resistor 100A to lead 77.

With the circuit breaker "closed," the grid of the switching vacuum tube is biased positive by battery 96, and is conducting so that current flows through the load. When current through the load tends to become excessive, the voltage drop across $R_{20}$ exceeds the bias of battery 96, and the grid of the thyratron becomes sufficiently positive with respect to its cathode that the thyratron conducts, causing a negative bias to be applied to the control grid of the switching tube with respect to its cathode, thus cutting off or substantially reducing the flow of current through the switching tube.

Figure 4:
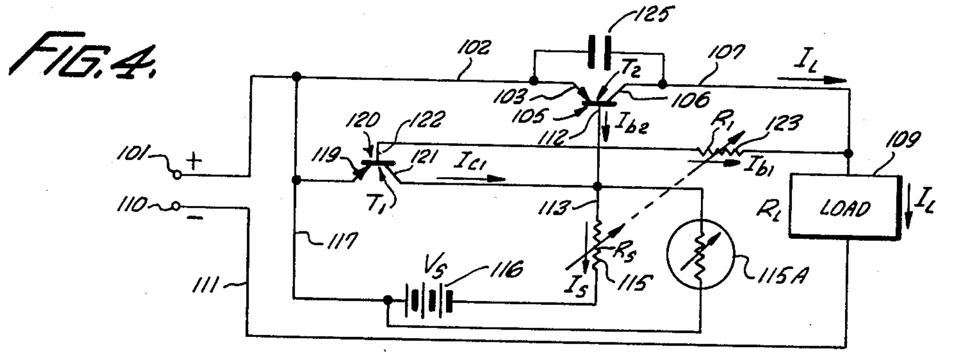
FIG. 4 is a schematic diagram of a circuit in which the voltage characteristic of a transistor switching device is used as a current sensing element to control the bistable circuit.

In the circuit shown in FIG. 4 current flows from a positive terminal 101 through a lead 102, an emitter 103 of a switching transistor 105, a collector 106 of the transistor 105, a conductor 107, a load 109, and back to a negative terminal 110 through a lead 111.

The base 112 of the transistor 105 is connected by a lead 113 to one end of a variable resistor 115, the other end of which is connected to the negative terminal of a battery 116, the positive terminal of which is connected by lead 117 to lead 102. The emitter 119 of a transistor 120 is connected to lead 117, and the collector 121 of the transistor 120 is connected to lead 113. The base 122 of the transistor 120 is connected to one end of a variable resistor 123, the other end of which is connected to lead 107. A by-pass capacitor 125 is connected to leads 102 and 107. If desired a temperature sensitive resistance element 115A (i.e., a thermistor or a semiconductor diode having a negative temperature coefficient of resistance) may be connected in parallel with the battery 116 and the resistor 115 for making the fuse level temperature dependent as will be more fully described.

In the circuit shown in FIG. 4, the switching transistor 105 is also used as the current sensing element. Disregarding the temperature sensitive element 115A, the fuse level is determined by the voltage ($V_s$) of the battery 116, the value of the resistor 115, and the current gain of the transistor 120 in accordance with the following formula:

$$\text{Maximum current through the load}=\frac{(\text{current gain of transistor 120})\ (V_s)}{(\text{value of resistor 115})}$$

In normal operation, the flow of current through transistor 105 is equal to the flow of current through the load, which in turn is determined by the voltage of the supply and the impedance of the load. The transistor 120 is normally nonconducting, and the currents through its respective base and collector are zero. The current through the base of transistor 105 is determined by the voltage of battery 116 and the resistance values of resistors 115 and 115A.

Disregarding the temperature sensitive element 115A, when the current through the load exceeds the value determined by the equation given above, the voltage drop across the emitter-collector circuit of the transistor 105 is sufficient to cause the transistor 120 to conduct, which in turn causes transistor 105 to become nonconducting. With the breaker in the open state, the current through the base of the transistor 120 is equal to the voltage of the power supply divided by the total of resistance 123 plus the resistance of the load. The current through the collector 121 of the transistor 120 is now determined by the ratio of the voltage of the battery 116 and the resistor 115. The circuit of FIG. 4 resets automatically when the load is diminished substantially or when the impedance of the load increases to a preselected value to cause the current through the base of transistor 120 to become so low that the transistor 120 stops conducting.

The temperature sensitive element 115A modifies the above described operation by varying the base current to the transistor 105 in accordance with the temperature (i.e., the temperature of the load or ambient temperature) so that the fuse level is reduced at high temperatures.

As discussed previously the fuse level of the circuit of FIG. 4 can be adjusted by changing the magnitude of the voltage ($V_s$) of the battery 116, the value of the resistor 115 or the current gain of the transistor 120. The resistor 115 may be a variable resistor (as shown in FIG. 4) such as a potentiometer to permit the fuse level of the circuit to be easily and readily adjusted to any desired value.

The capacitor 125 connected across the transistor 105 is useful when the circuit breaker of FIG. 4 is used in an A.C. bridge connection. Without the capacitor 125 connected in the circuit, the breaker resets quickly when the load conductance or power source voltage is substantially reduced or removed. With an A.C. power source, the source voltage would naturally tend to go to zero at the end of each half cycle of the alternating current supply. This would permit the breaker to reset at the end of each half cycle immediately after it has opened. This periodic resetting can be eliminated by using the capacitor 125 across the switching transistor as indicated in FIG. 4. With this capacitor in the circuit, the breaker remains open so long as the overload condition exists, but resets automatically when either the load conductance or the RMS (root mean squared) value of the supply voltage is substantially reduced.

Figure 5:
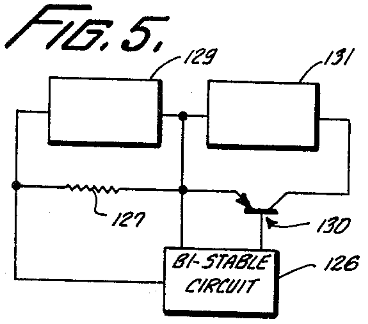
FIG. 5 is a schematic circuit diagram showing the use of a bistable element sensitive to the current flow in one circuit to control the flow of current through a second circuit.

In FIG. 5, a bistable circuit element 126 is connected across a sensing resistor 127, which in turn is connected in series with a first circuit 129 through which current flows. The bistable circuit element is also connected to a switching transistor 130 which in turn is connected in series with a second circuit 131 through which a current flows. When the current flow through the first circuit is sufficient to actuate the bistable circuit element, the switching transistor 130 is also actuated by the bistable element, thus controlling the operation of the circuit 131. For example, the turning off of current through circuit 131 is made a function of the magnitude of the current flowing through circuit 129.

The circuit breaker of this invention can be used for other purposes than just fusing. For example, in addition to the high speed fusing of a critical circuit, the breaker can be made to turn on a warning light or buzzer, or to turn off a large power switch. A simple arrangement for this purpose is to make the resistor $R_6$ in FIG. 2 the coil of a relay adapted to sound an alarm or open a larger power switch.

Figure 6:
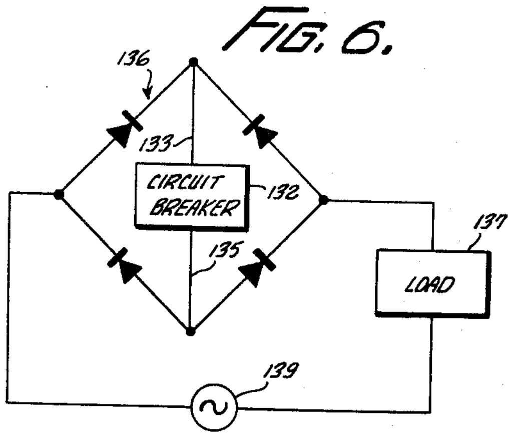
FIG. 6 is a schematic diagram of the circuit breaker of this invention used in an A.C. circuit.

Without modification, the circuits described in FIGS. 1 through 5 function properly for a load in one direction only. There use is extended to A.C. circuits by the addition of a bridge rectifier system as shown in FIG. 6. Briefly, a circuit breaker, indicated schematically by block 132, is connected by leads 133, 135 across a 4-arm rectifier bridge 136, which in turn is connected in series with a load 137 and an A.C. power supply 139. When the current through the bridge exceeds the value determined by the circuit breaker, the circuit breaker is actuated and current through the bridge and load is interrupted or substantially diminished. The circuit breaker can be any variation of the specific examples shown in FIG. 2 or FIG. 3, i.e., where manual resetting is required, or variations of the circuit breaker of FIG. 4, with capacitor 125 connected in the circuit.

Figure 7:
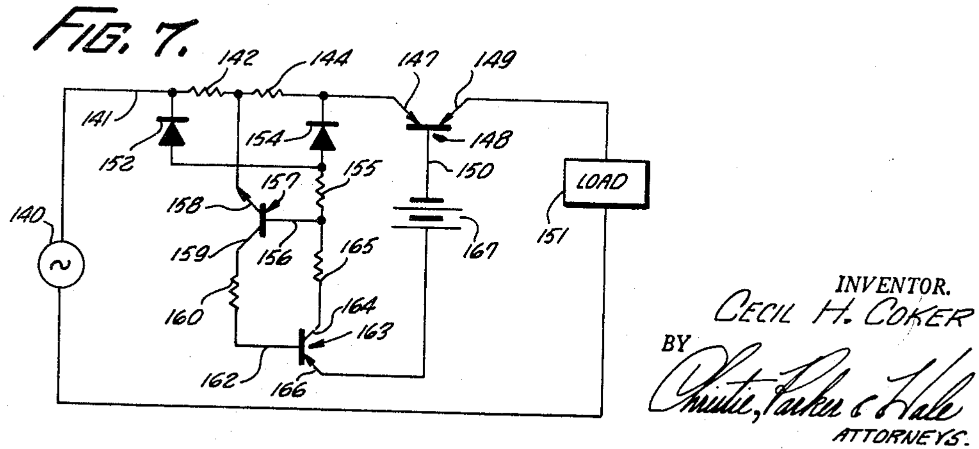
FIG. 7 is a schematic diagram of a circuit using a symmetrical transistor as the switching device to control alternating current.

An alternative circuit for the use of the circuit breaker of this invention with A.C. circuits is shown in FIG. 7 in which power flows from an A.C. source 140 through a lead 141, a resistor 142, a resistor 144, a first emitter 147 of a symmetrical switching transistor 148, a second emitter 149 of the symmetrical switching transistor, and a load 151 back to the power supply.

The negative terminals of rectifiers 152 and 154 are connected to the lead 141 and the emitter 147 respectively. The positive terminals of the rectifiers are connected together as shown. A resistor 155 is connected between the negative terminals of the rectifiers 152 and 154 and the base 156 of a transistor 157 (NPN type). The emitter 158 of the transistor 157 is connected to the junction of the resistors 142 and 144. The collector 159 of the transistor 157 is connected through a resistor 160 to the base 162 of a transistor 163 (PNP type). The collector 164 of the transistor 163 is connected to the base 156 through a resistor 165 so that the transistors 157 and 163 form a bistable element or "flip-flop." A bias source or battery 167 is connected between the emitter 166 of the transistor 163 and the base 150 of the transistor 148 so that the negative terminal of the battery is coupled to the base 150.

In the operation of the circuit of FIG. 7 the transistors 148, 157 and 163 are conducting when the circuit to the load 151 is closed. The transistors 157 and 163 form a bistable or "flip-flop" circuit in which both transistors are conducting in one state of operation (with one of the transistors being staturated) and neither of the transistors are conducting in the other state of operation. When the load current tends to exceed the value determined by the circuit components, the base 156 of the transistor 157 becomes sufficiently negative with respect to the emitter 158 to change the state of operation of the "flip-flop" circuit in a well-known manner. This causes the transistors 157 and 163 to be rendered nonconducting which, in turn, turns off the symmetrical switching transistor 148. The fuse level is set by a suitable choice of battery 167 and resistors 142, 144, 155 and 165. It should be understood that the transistor 148 need not be perfectly symmetrical. It is only necessary that the electrodes 147 and 149 operate alternatively as emitter and collector electrodes. The values of the resistors 142 and 144 may be appropriately chosen to compensate for any asymmetry of the transistor 148. The voltage of the battery 167 must, of course, be greater than the peak value of the voltage from the source 140.

In some situations the automatic resetting action of the circuit of FIG. 4 (with capacitor 125 removed from the circuit) is desirable. In this mode of operation, the average and RMS current permitted to flow is dependent on the interrupting level to which the circuit breaker is set. This level is approximately a linear function of the voltage supplied by battery 116. Thus, the average current supplied to the load can be controlled by changing the voltage of this battery. Since the power taken from the battery 116, plus the other losses in the circuit, are small compared to the power which is delivered to the load, the circuit breaker works as an amplifier with high gain and efficiency.

FIG. 6 shows a circuit with a circuit breaker connected across a rectifier bridge, which is in series with a load. Instead of using a circuit breaker which requires resetting, as previously described for FIG. 6, a circuit breaker, which automatically is self-setting, say the circuit breaker of FIG. 4 (with capacitor 125 removed) is used to act as control device to deliver modified alternating current to the load.

Figure 8:
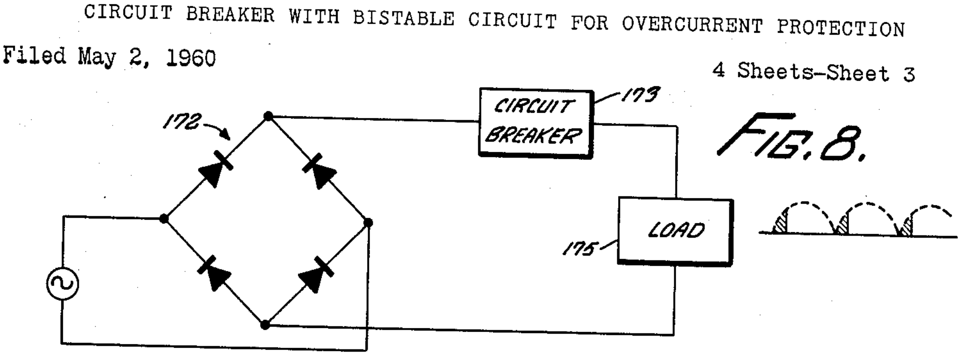
FIG. 8 is a schematic circuit diagram of the circuit breaker used to control full wave pulsating D.C. to a load, accompanied by a wave form diagram showing the flow of current through the load.

FIG. 8 shows a rectifier bridge 172 with a self-resetting circuit breaker 173 and load 175 connected in series across the bridge. With this arrangement the full wave pulsating D.C. is supplied to the load as indicated in the wave form diagram to the right of the schematic circuit shown in FIG. 8.

Figure 9:
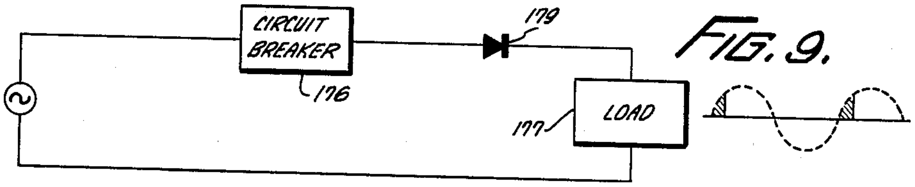
FIG. 9 is a schematic diagram of the circuit breaker and resulting wave form when the invention is used to control half wave pulsating D.C. to a load.

In FIG. 9, a self-resetting circuit breaker 176 (of the type shown in FIG. 4 modified by removal of capacitor 125) and load 177 are connected in series with a half wave rectifier 179 and the A.C. power supply to furnish a half wave pulsating D.C. current to the load as shown by the wave form diagram to the right of the schematic circuit diagram.

Figure 10:
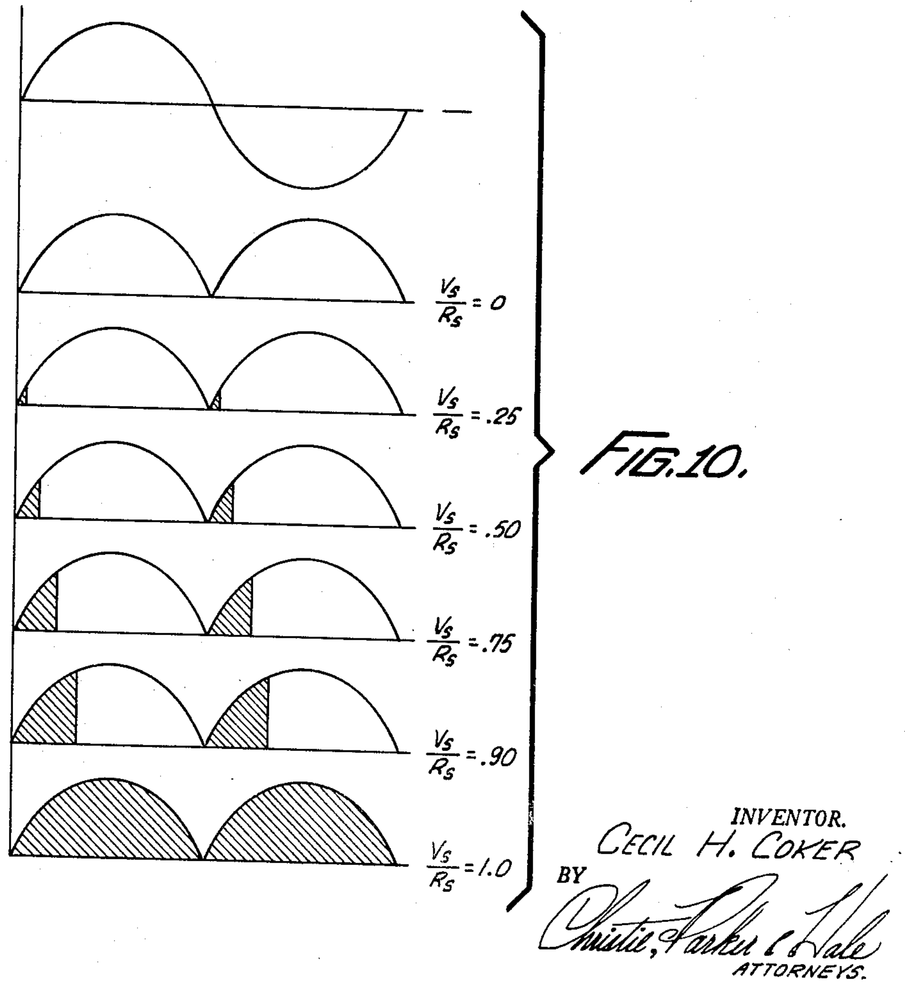
FIG. 10 is a set of wave-form diagrams of the operation of the current breaker used as a control for full wave pulsating D.C. in a circuit such at that shown in FIG. 9.

FIG. 10 is a set of wave form diagrams showing current flow through the load with the electronic circuit breaker of FIG. 4 (modified by removal of capacitor 125) installed in the circuit of FIG. 8 for different ratios of the voltage of battery 116 ($V_s$) to the resistor 115 ($R_s$).

Without modification, the electronic circuit breakers described above do not cut the current off completely, but permit a small current to flow when the breaker is open. In breakers designed for a fuse level which is fixed or variable over a restricted range, this leakage current is quite small compared to working load currents. If the circuit breaker must work for an extreme range of breaker levels, the leakage current can become significant in comparison to the operating currents on the lower ranges. Various methods for reducing the leakage currents of transistors are well-known in the art. For example, several such methods are shown in FIGS. 4, 11, 12 and 13.

In the circuit breaker of FIG. 4 the base current, to maintain the transistor 120 conducting (when the breaker is open or transistor 105 is nonconducting), must flow through the load 109. If the resistors 115 and 123 are not ganged, the leakage current (base current of transistor 120) can be reduced by an appropriate choice of resistor 115 to only $$\frac{K}{B_1B_2}$$

times the highest setting of the fuse level (about $\frac{1}{1000} \times I_L$ max.) where K is a constant greater than unity, $B_1$ and $B_2$ are the respective current gains of the transistors 120 and 105, respectively and $I_L$ max. is the maximum load current or final level of the circuit breaker.

The resistors 115 and 123 may be ganged (as shown in FIG. 4) and the fuse level may be adjusted by changing the value of the resistance of the resistor 115 with the voltage of the battery 116 being held constant. This arrangement provides a leakage current of $$\frac{K}{B_1B_2}$$

times the fuse level for all settings, and thereby greatly decrease the leakage current for low level fuse settings.

If $I_L$ max. is varied by changing $R_s$ (instead of $V_s$) then the optimum $R_1$ is a constant multiple of $R_s$.

Figure 11:
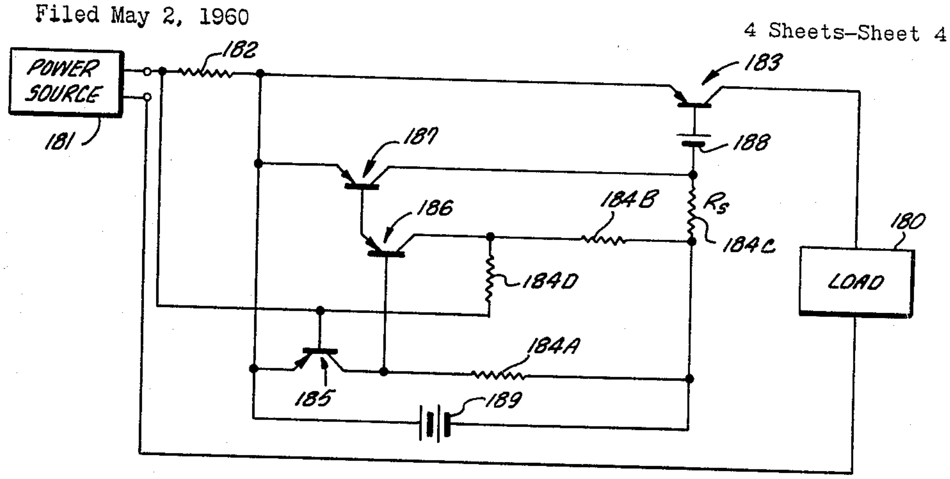
FIG. 11 is a schematic circuit diagram showing a modification of the circuit of FIG. 2 to reduce leakage current through the switching transistor.

In the circuit of FIG. 11, a load 180 is supplied current from a power source 181 through a resistor 182. A switching transistor 183 is connected as shown in the figure to control current flow through the load 180. Transistors 185, 186, and 187 are connected to sense the amount of current flowing through the load and operate the switching transistor. Resistors 184A and 184B, and 184C are connected between the negative terminal of a battery 189 and the collector electrodes of the transistors 185 and 186 and 187, respectively, as shown. A resistor 184D is connected between the collector of transistor 186 and one terminal of the power source as shown. The circuit of FIG. 11 does not have the base drive leakage of the simple circuit breaker shown in FIG. 4, but there is still a small leakage current through the switching transistor 183 due to its characteristics and the manner in which it is controlled. This leakage is substantially reduced by using a battery 188 to make the base of the switching transistor slightly positive with respect to its emitter, so long as transistor 187 is conducting.

Figure 12:
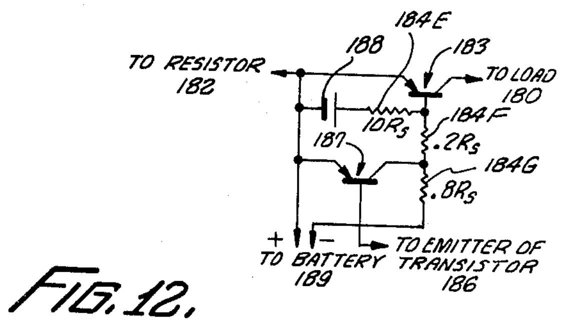
FIG. 12 is a schematic circuit diagram of an alternate arrangement for reducing the leakage current through the switching transistor.

FIG. 12 is a schematic circuit diagram showing an alternate arrangement for making the base of the switching transistor 183 of FIG. 11 slightly positive with respect to its emitter by using the battery 188 in a different position. In this case, the value of the voltage supplied by the battery 188 is about the same as that of the battery 189 connected in the circuit of FIG. 11. In the circuit of FIG. 12 a resistor 184E is coupled between the positive terminal of the battery 188 and the base of the transistor 183. A resistor 184F is connected in series between the base of the transistor 183 and the collector of transistor 187 and a resistor 184G (substituted for 184C) is connected between the collector of the transistor 187 and negative terminal of the battery 189. The resistors 184E, 184F and 184G may have resistance values relative to $R_s$ (the resistance value of the resistor 184C in FIG. 11) as shown.

Figure 13:
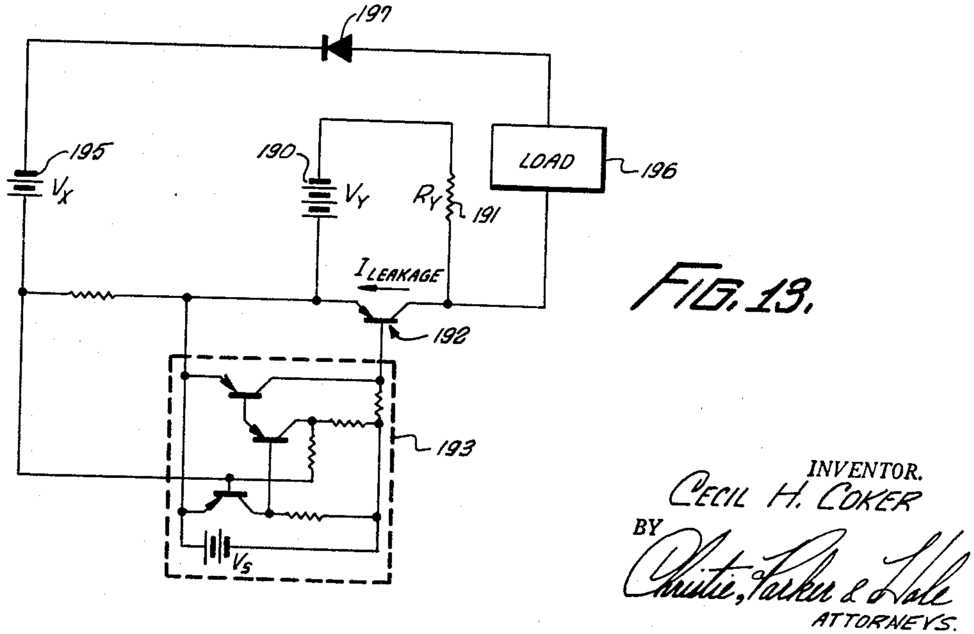
FIG. 13 is a schematic circuit diagram of another arrangement for reducing leakage of current through the switching transistor.

Even with the positive biasing of the base as shown in FIGS. 11 and 12, a small leakage still exists because of thermal effects. If necessary, this leakage is eliminated by using a circuit breaker with two power supplies as shown in FIG. 13. In this case, an auxiliary power supply 190 is connected in series with a resistor 191 across a switching transistor 192, which is controlled by a bistable circuit 193 of the type shown in FIG. 11. A primary power supply 195 supplies power to a load 196 through a rectifier 197. No leakage flows through the load with the circuit breaker open by maintaining the following relationship:

$$|V_y| - |V_x| > (I_{\text{leakage}} \times R_y)$$

Where:

$|V_y|$=absolute voltage of power supply 190,
$|V_x|$= absolute voltage of power supply 195,
$I_{\text{leakage}}$=Leakage current if $V_y$ were out of circuit,
$R_y$=resistance of resistor 191.

I claim:

1. A circuit breaker for a current passing through a load, the circuit breaker comprising a thyratron element, means responsive to current through the load for changing the thyratron from a first to a second state of operation, electronic switching means connected in series with the load for increasing and decreasing the current passing through the load, and means responsive to the state of operation of the thyratron for actuating the electronic switching means to open the circuit to the load when the current through the load reaches a predetermined value.

2. A circuit breaker for a current passing through a load comprising at least two variable and controllable impedance devices, each of the impedance devices including a first electrode, a second electrode and a control electrode for controlling the current flow between the first and second electrodes in accordance with the amplitude of the instantaneous signal between the first and control electrodes, means for connecting the first and second electrodes of one of the variable impedance devices in series with the load for controlling the current thereto, means for connecting the first and second electrodes of the other variable impedance device between the first and control electrodes of said one variable impedance device to render said one variable impedance device conducting to provide a very low impedance between the first and second electrodes thereof when said other variable impedance device is nonconducting and to render said one variable impedance device nonconducting to provide a very high impedance between the first and second electrodes thereof when said other variable impedance device is conducting so that the variable impedance devices form a bistable flip-flop circuit and means coupled between the first and control electrodes of said other variable impedance device and responsive to the current through the load for maintaining said other variable impedance device nonconducting until the current through the load reaches a predetermined value and for rendering said other variable impedance device conducting when the current through the load exceeds said predetermined value to open the circuit to the load.

3. The combination defined in claim 2 including means coupled to one of said pair of variable impedance devices and responsive to the value of the impedance of the load for changing the state of operation of said other impedance from a conducting to a nonconducting state when the impedance of the load increases to a preselected value to automatically reclose the circuit to the load.

4. A circuit breaker for a current passing through a load comprising first and second transistors, each of the transistors including a collector, an emitter and a base electrode, means for connecting the emitter and collector electrodes of the first transistor in series with the load to open and close the circuit to the load, means for connecting the emitter and base electrodes of the second transistor across the emitter and collector electrodes of the first transistor to control the state of conduction of the second transistor in accordance with the current flow through the emitter and collector electrodes of the first transistor, means coupling the collector electrode of the second transistor to the base electrode of the first transistor to render the first transistor nonconducting when the second transistor is conducting, and bias means coupled between the emitter and collector electrodes of the second transistor for maintaining the first transistor conducting until the second transistor is rendered conducting by predetermined voltage drop across the first transistor.

5. The combination defined in claim 4 wherein the first and second transistors are connected in a bistable circuit and wherein the bias means includes a first variable resistor connected in series with the base and emitter electrodes of the second transistor for controlling the state of conduction of the first and second transistors and thereby the maximum value of the current through the load which is necessary to render the first and second transistors nonconducting and conducting, respectively.

6. The combination defined in claim 5 including a second variable resistor connected in series with the collector emitter electrodes of the second transistor, the first and second variable resistors being ganged.

7. The combination as defined in claim 5 including a second resistor connected in series with the collector and emitter electrodes of the second transistor and temperature sensitive resistance means connected between the base and emitter electrodes of the first transistor for varying the conduction of the first transistor in accordance with the ambient temperature.

8. The combination as defined in claim 5 including capacitance means connected between the emitter and collector electrodes of the first transistor.

9. The combination as defined in claim 5 including a source of alternating current energizing potential and rectifying means connected in series relationship with the collector and emitter electrodes of the first transistor.

10. A circuit breaker for a current passing through a load comprising a bistable electronic circuit, means responsive to a maximum predetermined current through the load for changing the bistable circuit from a first to a second state of operation, a transistor having emitter, base and collector electrodes, means for connecting the emitter and collector electrodes of the transistor in series with the load, means for coupling the emitter and base electrodes of the transistor to the bistable circuit for rendering the transistor conducting when the bistable circuit is in the first state of operation and for rendering the transistor nonconducting to open the circuit to the load when the bistable circuit is in the second state of operation, and bias means connected between the emitter and base electrodes of the transistor to reverse bias the base and emitter electrodes when the bistable circuit is in the second state of operation to reduce the leakage current through the transistor when the circuit to the load is open.

11. A circuit breaker for a current passing through a load comprising first and second transistors, each of the transistors including a collector, an emitter and a base electrode, means for connecting the emitter and collector electrode of the first transistor in series with the load to open and close the circuit to the load, means for connecting the emitter and collector electrodes of the second transistor between the emitter and base electrodes of the first transistor to render the first transistor conducting when the second transistor is nonconducting and to render the first transistor nonconducting when the second transistor is conducting, a bistable flip-flop circuit connected to the emitter and base electrodes of the second transistor for controlling the conduction of the second transistor in accordance with the state of operation of the flip-flop circuit, means coupled to the flip-flop circuit and responsive to the current through the load for controlling the state of operation of the flip-flop circuit to render the second transistor conducting when the current through the load exceeds a predetermined value to open the circuit to the load, and bias means connected between the emitter and base electrodes of the first transistor to reverse bias the emitter and base electrodes of the first transistor when the first transistor is rendered nonconducting for reducing the leakage current through the first transistor.

References Cited by the Examiner

UNITED STATES PATENTS

| | | | |
|---|---|---|---|
| 2,571,027 | 10/51 | Garner | 317—16 |
| 2,815,446 | 12/57 | Coombs | 317—16 |
| 2,875,382 | 2/59 | Sandin | 317—33 |
| 2,885,570 | 5/59 | Bright | 317—33 |
| 2,913,599 | 11/59 | Benton | 317—33 |
| 2,957,109 | 10/60 | White | 317—33 |

OTHER REFERENCES

Electric Design: "Ideas for Design," page 46, May 27, 1959.

SAMUEL BERNSTEIN, *Primary Examiner.*

LLOYD McCOLLUM, *Examiner.*